US012615340B2

(12) United States Patent
Tojo

(10) Patent No.: US 12,615,340 B2
(45) Date of Patent: Apr. 28, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD FOR APPLYING COLOR CONVERSION INFORMATION ASSOCIATED WITH OUTPUT JOB INFORMATION

(71) Applicant: FUJIFILM Business Innovation Corp., Tokyo (JP)

(72) Inventor: Takahiro Tojo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 446 days.

(21) Appl. No.: 18/161,892

(22) Filed: Jan. 31, 2023

(65) Prior Publication Data

US 2024/0089395 A1 Mar. 14, 2024

(30) Foreign Application Priority Data

Sep. 13, 2022 (JP) ................................. 2022-145628

(51) Int. Cl.
*H04N 1/54* (2006.01)
(52) U.S. Cl.
CPC .................................... *H04N 1/54* (2013.01)

(58) Field of Classification Search
None
See application file for complete search history.

(56) References Cited

U.S. PATENT DOCUMENTS

| | | | |
|---|---|---|---|
| 10,452,331 B2 | 10/2019 | Murata | |
| 2017/0118382 A1* | 4/2017 | Sugita | .................. H04N 1/6055 |
| 2022/0027101 A1* | 1/2022 | Yamamoto | .............. G06F 3/126 |

FOREIGN PATENT DOCUMENTS

| | | |
|---|---|---|
| JP | 2018018318 | 2/2018 |
| JP | 2021016966 | 2/2021 |

* cited by examiner

*Primary Examiner* — Thomas D Lee
(74) *Attorney, Agent, or Firm* — JCIPRNET

(57) ABSTRACT

An information processing apparatus includes a processor configured to acquire job information registered in another information processing apparatus different from the information processing apparatus and identification information for identifying color conversion information associated with the job information, and output the job information by applying the color conversion information registered in a predetermined apparatus in a case where the color conversion information related to the identification information is registered in both the information processing apparatus and the other information processing apparatus.

9 Claims, 4 Drawing Sheets

INFORMATION PROCESSING APPARATUS, NON-TRANSITORY COMPUTER READABLE MEDIUM STORING INFORMATION PROCESSING PROGRAM, AND INFORMATION PROCESSING METHOD FOR APPLYING COLOR CONVERSION INFORMATION ASSOCIATED WITH OUTPUT JOB INFORMATION

CROSS-REFERENCE TO RELATED APPLICATIONS

This application is based on and claims priority under 35 USC 119 from Japanese Patent Application No. 2022-145628 filed Sep. 13, 2022.

BACKGROUND

(i) Technical Field

The present invention relates to an information processing apparatus, a non-transitory computer readable medium storing an information processing program, and an information processing method.

(ii) Related Art

JP2021-016966A discloses an image forming apparatus. The image forming apparatus includes a communication device connected to a network, a color conversion processing unit, a printing device, and a storage device that stores a color profile for the printing device. The image forming apparatus includes a profile management unit that acquires a name of the color profile stored in another color conversion device from the other color conversion device connected to the network by using the communication device. The image forming apparatus includes a job management unit that displays a profile list including the name of the color profile acquired by the profile management unit and a name of a color profile stored in the storage device on a user interface and specifies a color profile selected from the profile list by the user in a case where the image forming apparatus accepts a job request for a job using the printing device. The color conversion processing unit executes color conversion of an image to be printed according to the color profile specified by the job management unit. The job management unit causes the printing device to print the image to be printed after the color conversion according to the job request.

JP2018-018318A discloses an image forming apparatus set as a child apparatus, which is applied to a printing system that includes a user terminal connected to a network and a plurality of image forming apparatuses and can use a print service in which the user terminal transmits a print job to a parent apparatus based on identification information of an image forming apparatus set as the parent apparatus among the plurality of image forming apparatuses, the parent apparatus stores the print job from the user terminal, and the image forming apparatus set as the child apparatus among the plurality of image forming apparatuses executes the print job stored in the parent apparatus. The image forming apparatus includes an identification information setting storage unit that stores the identification information of the parent apparatus, and an identification information transmission control unit that transmits the identification information stored in the identification information setting storage unit to the user terminal when the print service is used.

2

SUMMARY

There is a technique in which an information processing apparatus applies color conversion information to job information registered in another information processing apparatus different from the information processing apparatus and outputs the color conversion information. In this technique, in a case where apparatuses in which pieces of color conversion information are registered are different, even though pieces of identification information for identifying the pieces of color conversion information are identical, the pieces of identification information may indicate pieces of different color conversion information. Accordingly, in a case where the color conversion information related to the identical identification information is registered in both the information processing apparatus and the other information processing apparatus, there is a problem that the color conversion information associated with the output job information is not applied.

Aspects of non-limiting embodiments of the present disclosure relate to provide an information processing apparatus, a non-transitory computer readable medium storing an information processing program, and an information processing method that can output job information by applying associated color conversion information even though color conversion information related to identical identification information is registered in both an information processing apparatus and another information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

In order to achieve the above object, according to an aspect of the present disclosure, there is provided an information processing apparatus including a processor configured to acquire job information registered in another information processing apparatus different from the information processing apparatus and identification information for identifying color conversion information associated with the job information, and output the job information by applying the color conversion information registered in a predetermined apparatus in a case where the color conversion information related to the identification information is registered in both the information processing apparatus and the other information processing apparatus.

BRIEF DESCRIPTION OF THE DRAWINGS

Exemplary embodiment(s) of the present invention will be described in detail based on the following figures, wherein:

FIG. 3 is a block diagram showing an example of a hardware configuration of a child apparatus according to the exemplary embodiment;

DETAILED DESCRIPTION

Figure 1:
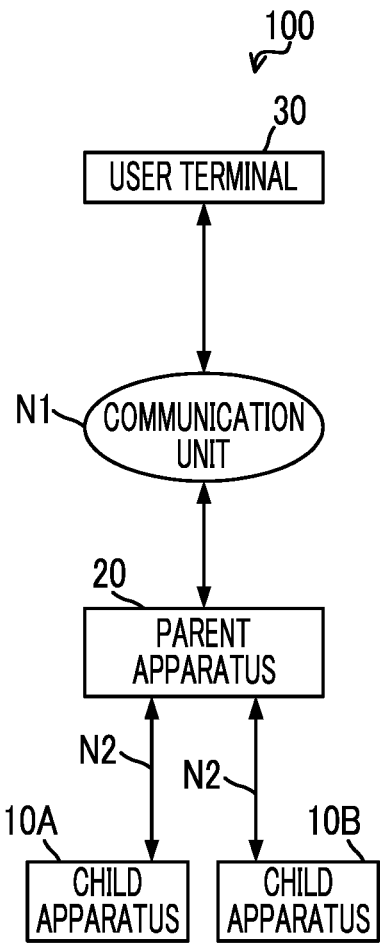
FIG. 1 is a schematic diagram showing an example of a hardware configuration of an information processing system according to an exemplary embodiment.

Hereinafter, an example of an exemplary embodiment of the present disclosure will be described with reference to the drawings. In the drawings, identical or equivalent components and parts are denoted by the same reference symbols. In addition, dimensional ratios in the drawings are exaggerated for the sake of convenience in description and may differ from actual ratios.

As shown in FIG. 1, an information processing system 100 according to the present exemplary embodiment includes child apparatuses 10A, 10B, . . . as an example of an information processing apparatus, a parent apparatus 20 as an example of another information processing apparatus different from the child apparatus 10, and a user terminal 30 owned by a user. Hereinafter, in a case where the child apparatuses 10A, 10B, . . . are described without distinction, these apparatuses are simply collectively referred to as "child apparatus 10".

The child apparatus 10 and the parent apparatus 20 can communicate with each other via a communication unit N2. In the present exemplary embodiment, a plurality of child apparatuses 10 are connected to one parent apparatus 20 via the communication unit N2 without using a server. The number of child apparatus 10 and the number of parent apparatuses 20 are not limited to the number shown in FIG. 1. In addition, in the present exemplary embodiment, a communication line in a company such as LAN or WAN is applied as the communication unit N2. However, the present disclosure is not limited to this example. For example, as the communication unit N2, a public communication line such as the Internet or a telephone line may be applied, or a communication line in a company and a public communication line may be applied in combination. In addition, in the present exemplary embodiment, a wireless communication line is applied as the communication unit N2. However, as the communication unit N2, a wired communication line may be applied, or wired and wireless communication lines may be applied in combination.

In addition, the parent apparatus 20 and the user terminal 30 can communicate with each other via a communication unit N1. In the present exemplary embodiment, a public communication line such as the Internet or a telephone line is applied as the communication unit N1. However, the present disclosure is not limited to this example. For example, as the communication unit N1, a communication line in a company such as a local area network (LAN) or a wide area network (WAN) may be applied, or a communication line in a company and a public communication line may be applied in combination. In addition, in the present exemplary embodiment, a wireless communication line is applied as the communication unit N1. However, as the communication unit N1, a wired communication line may be applied, or wired and wireless communication lines may be applied in combination.

A mobile phone such as a smartphone, a personal computer (laptop computer), or the like is applied as an example of the user terminal 30.

Figure 2:
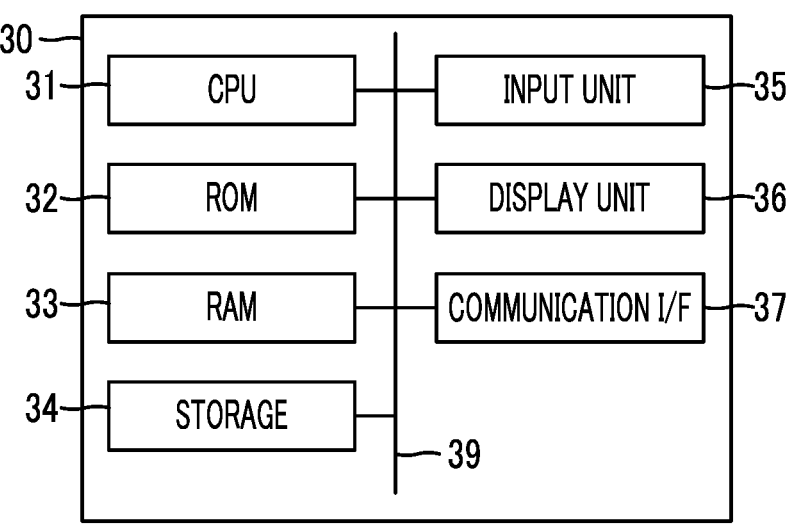
FIG. 2 is a block diagram showing an example of a hardware configuration of a user terminal according to the exemplary embodiment.

As shown in FIG. 2, the user terminal 30 has configurations of a central processing unit (CPU) 31, a read only memory (ROM) 32, a random access memory (RAM) 33, a storage 34, an input unit 35, a display unit 36, and a communication interface (I/F) 37. The configurations are connected to each other via a bus 39 to be able to communicate with each other.

The CPU 31 is a central arithmetic processing unit that executes various programs and controls each unit. That is, the CPU 31 reads out a program from the ROM 32 or the storage 34, and executes the program by using the RAM 33 as a work area. The CPU 31 performs the control of each configuration and various kinds of arithmetic processing according to the program stored in the ROM 32 or the storage 34. In the present exemplary embodiment, a preprocessing program 32A is stored in the ROM 32 or the storage 34.

The ROM 32 stores various programs and various kinds of data. The RAM 33 temporarily stores a program or data as the work area. The storage 34 is a storage device such as a hard disk drive (HDD) or a solid state drive (SSD), and stores various programs including an operating system and various kinds of data.

The input unit 35 includes a pointing device such as a mouse and a keyboard, and is used to perform various inputs.

The display unit 36 is, for example, a liquid crystal display and displays various kinds of information. The display unit 36 may function as the input unit 35 by adopting a touch panel system.

The communication I/F 37 is an interface for communicating with another apparatus such as the parent apparatus 20, and for example, standards such as Ethernet (registered trademark), FDDI, and Wi-Fi (registered trademark) are used.

An image forming apparatus is applied as an example of the child apparatus 10 and the parent apparatus 20. However, the present disclosure is not limited to this example. The child apparatuses 10 and the parent apparatus 20 may be apparatuses that perform any information processing. Here, the information processing includes, for example, processing of executing printing from text data, image data, or the like, processing of generating or processing data by using pieces of equipment included in the child apparatus 10 and the parent apparatus 20, processing of exchanging data between the child apparatus 10 and the parent apparatus 20.

Figure 3:
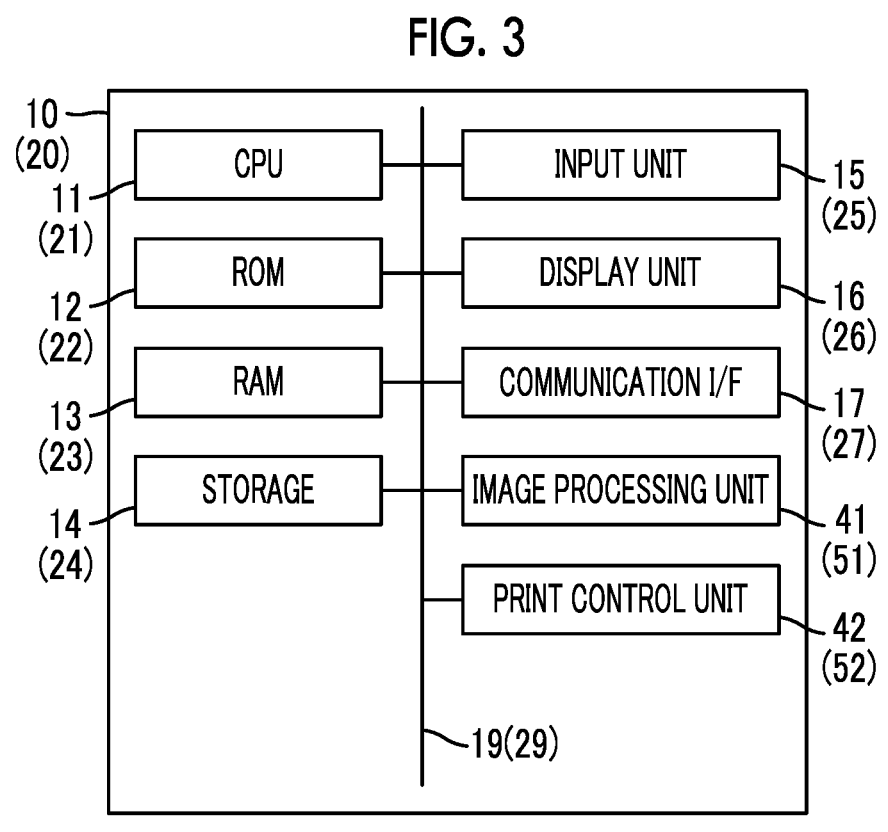

As shown in FIG. 3, the child apparatus 10 has configurations of a CPU 11, a ROM 12, a RAM 13, a storage 14, an input unit 15, a display unit 16, a communication I/F 17, an image processing unit 41, and a print control unit 42. The configurations are connected to each other via a bus 19 to be able to communicate with each other. Since the child apparatuses 10 and the parent apparatus 20 have a configuration of a general image forming apparatus, the child apparatus 10 is described as a representative, the description of the parent apparatus 20 is omitted, and only the corresponding reference symbols are shown in FIG. 3.

The CPU 11 is a central arithmetic processing unit that executes various programs and controls each unit. That is, the CPU 11 reads out a program from the ROM 12 or the storage 14, and executes the program by using the RAM 13 as a work area. The CPU 11 performs the control of each configuration and various kinds of arithmetic processing according to the program stored in the ROM 12 or the storage 14. In the present exemplary embodiment, an information processing program 12A is stored in the ROM 12 or the storage 14.

The ROM 12 stores various programs and various kinds of data. The RAM 13 temporarily stores a program or data as the work area. The storage 14 is a storage device such as an HDD or an SSD, and stores various programs including an operating system and various kinds of data.

The input unit 15 includes a pointing device such as a mouse and a keyboard, and is used to perform various inputs.

The display unit 16 is, for example, a liquid crystal display and displays various kinds of information. The display unit 16 may function as the input unit 15 by adopting a touch panel system.

The communication OF 17 is an interface for communicating with another apparatus such as the parent apparatus 20, and for example, standards such as Ethernet (registered trademark), FDDI, and Wi-Fi (registered trademark) are used.

The image processing unit 41 performs various kinds of image processing. The print control unit 42 performs image forming processing, detection processing of detecting a sheet fed into a tray, transport processing of transporting the sheet, and the like.

Next, a flow of the information processing in the child apparatus 10 of the present exemplary embodiment will be described with reference to FIG. 4. The information processing is performed by the CPU 11 reading out the information processing program 12A from the ROM 12 or the storage 14, loading the information processing program into the RAM 13, and executing the information processing program.

Figure 4:
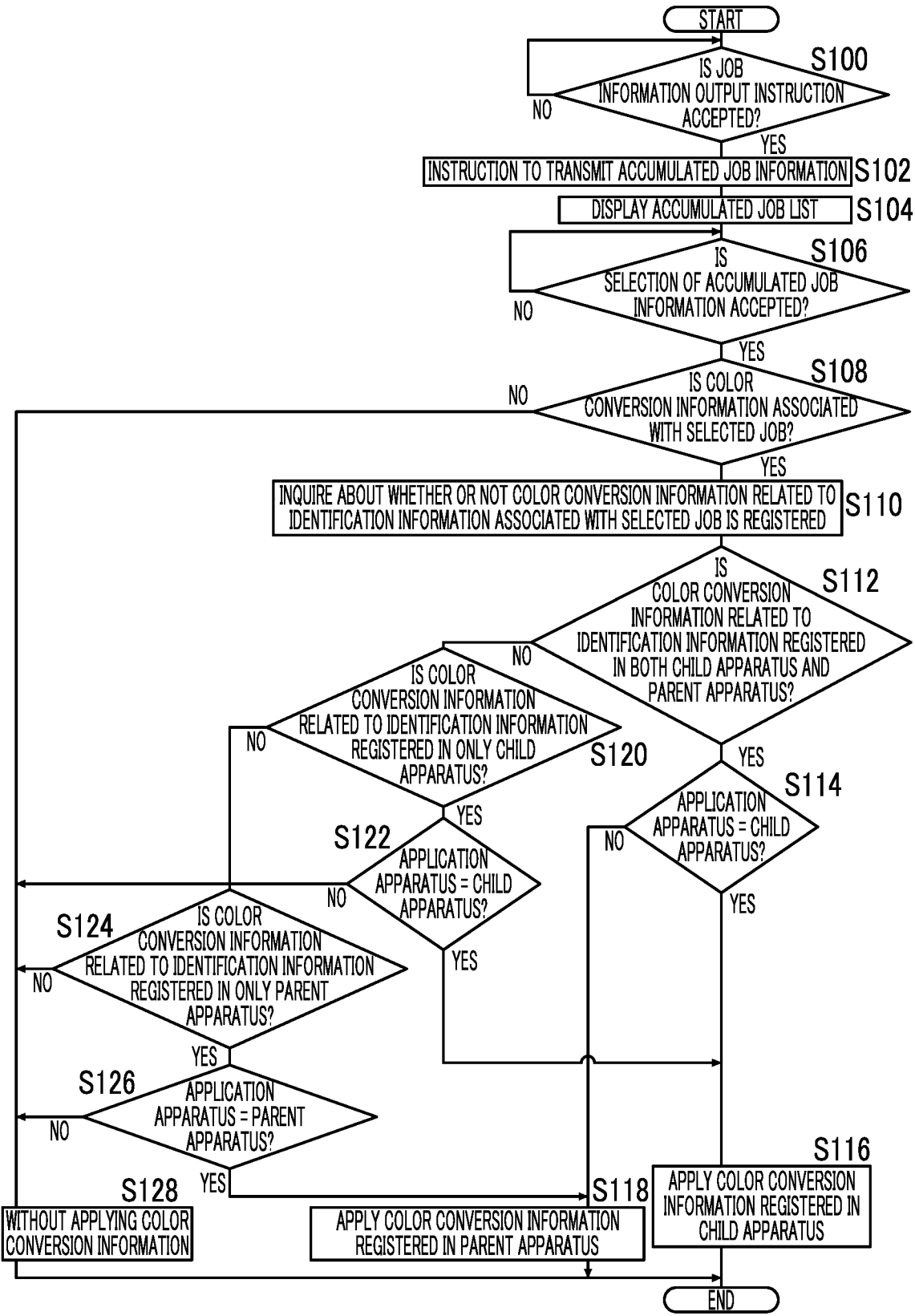
FIG. 4 is a flowchart showing an example of a flow of information processing in the child apparatus according to the exemplary embodiment.

In step S100 of FIG. 4, the CPU 11 waits until an instruction to output job information registered in the parent apparatus 20 is accepted by the child apparatus 10 which is a host apparatus via the input unit 15. In a case where an instruction to output the job information registered in the parent apparatus 20 by the child apparatus 10 which is the host apparatus is accepted (YES in step S100), the CPU 11 proceeds to step S102.

In step S102, the CPU 11 transmits, to the parent apparatus 20, an instruction to transmit the job information registered in advance by the user in the parent apparatus 20 and accumulated job information which is identification information for identifying color conversion information associated with the job information.

Here, the color conversion information is information indicating a color space applied in a case where tint of the associated job information is adjusted and output. In addition, the identification information for identifying the color conversion information is a name of the color conversion information, identification (ID) of the color conversion information, or the like.

In step S104, the CPU 11 displays an accumulated job list which is a list of pieces of accumulated job information received from the parent apparatus 20 on the display unit 16. In step S104, the CPU 11 may display only pieces of job information in a list among the pieces of accumulated job information received from the parent apparatus 20.

In step S106, the CPU 11 waits until the selection of any accumulated job information among the pieces of accumulated job information displayed in the accumulated job list is accepted via the input unit 15. In a case where the selection of any of the accumulated job information is accepted (YES in step S106), the CPU 11 proceeds to step S108.

In step S108, the CPU 11 determines whether or not color conversion information is associated with the job information (hereinafter, referred to as a "selected job") in the accumulated job information for which the selection is accepted in step S106. In other words, the CPU 11 determines whether or not the identification information is registered together with the selected job. In a case where the color conversion information is associated with the selected job (YES in step S108), the CPU 11 proceeds to step S110. On the other hand, in a case where the color conversion information is not associated with the selected job (NO in step S108), the CPU 11 proceeds to step S128.

In step S110, the CPU 11 inquires the parent apparatus 20 about whether or not the color conversion information related to the identification information associated with the selected job is registered in the parent apparatus 20.

In step S112, the CPU 11 determines whether or not the color conversion information related to the identification information associated with the selected job is registered in both the child apparatus 10 which is the host apparatus and the parent apparatus 20. Specifically, the CPU 11 determines whether or not the color conversion information related to the identification information associated with the selected job is registered in the storage 14 of the host apparatus and the color conversion information is also registered in the parent apparatus 20. In a case where the color conversion information related to the identification information associated with the selected job is registered in both the child apparatus 10 which is the host apparatus and the parent apparatus 20 (YES in step S112), the CPU 11 proceeds to step S114.

In step S114, the CPU 11 determines, from the storage 14, whether or not a predetermined application apparatus (hereinafter, simply referred to as "application apparatus") is the child apparatus 10. In a case where the application apparatus is the child apparatus 10 (YES in step S114), the CPU 11 proceeds to step S116. Details of processing of registering the application apparatus in the storage 14 will be described later.

In step S116, the CPU 11 outputs the selected job by applying the color conversion information related to the identification information registered in the child apparatus 10 and associated with the selected job, and ends this information processing.

Returning to step S114, in a case where the application apparatus is not the child apparatus 10, that is, the application apparatus is the parent apparatus 20 (NO in step S114), the CPU 11 proceeds to step S118. In step S118, the CPU 11 outputs the selected job by applying the color conversion information related to the identification information registered in the parent apparatus 20 and associated with the selected job, and ends this information processing.

Returning to step S112, in a case where the color conversion information related to the identification information associated with the selected job is not registered in both the child apparatus 10 and the parent apparatus 20, the CPU 11 proceeds to step S120 (NO in step S112). In step S120, the CPU 11 determines whether or not the color conversion information related to the identification information associated with the selected job is registered only in the child apparatus 10 which is the host apparatus. Specifically, the CPU 11 determines whether or not the color conversion information related to the identification information associated with the selected job is registered in the storage 14 of the host apparatus and the color conversion information is not registered in the parent apparatus 20. In a case where the color conversion information related to the identification information associated with the selected job is registered only in the child apparatus 10 which is the host apparatus (YES in step S120), the CPU 11 proceeds to step S122.

In step S122, the CPU 11 determines whether or not the application apparatus registered in the storage 14 is the child apparatus 10 which is the host apparatus. In a case where the application apparatus is the child apparatus 10 which is the host apparatus (YES in step S122), the CPU 11 proceeds to step S116. On the other hand, in a case where the application apparatus is not the child apparatus 10 which is the host apparatus, that is, the application apparatus is the parent apparatus 20 (NO in step S122), the CPU 11 proceeds to step S128.

Returning to step S120, in a case where the color conversion information related to the identification information associated with the selected job is not registered in the child apparatus 10 (NO in step S120), the CPU 11 proceeds to step S124. In step S124, the CPU 11 determines whether or not the color conversion information related to the identification information associated with the selected job is registered only in the parent apparatus 20. Specifically, the CPU 11 determines whether or not the color conversion information related to the identification information associated with the selected job is not registered in the storage 14 of the host apparatus and the color conversion information is registered in the parent apparatus 20. In a case where the color conversion information related to the identification information associated with the selected job is registered only in the parent apparatus 20 (YES in step S124), the CPU 11 proceeds to step S126. On the other hand, in a case where the color conversion information related to the identification information associated with the selected job is not registered in the parent apparatus 20, that is, in a case where the color conversion information related to the identification information associated with the selected job is not registered in both the child apparatus 10 and the parent apparatus 20 (NO in step S124), the CPU 11 proceeds to step S128.

In step S126, the CPU 11 determines whether or not the application apparatus registered in the storage 14 is the parent apparatus 20. In a case where the application apparatus is the parent apparatus 20 (YES in step S126), the CPU 11 proceeds to step S118. On the other hand, in a case where the application apparatus is not the parent apparatus 20, that is, the application apparatus is the child apparatus 10 (NO in step S126), the CPU 11 proceeds to step S128.

In step S128, the CPU 11 outputs the selected job without applying the color conversion information, and ends this information processing.

Next, a flow of preprocessing in the information processing system 100 of the present exemplary embodiment will be described with reference to FIG. 5. The preprocessing is performed by the CPU 31 of the user terminal 30 reading out the preprocessing program 32A from the ROM 32 or the storage 34, loading the preprocessing program into the RAM 33, and executing the preprocessing program.

Figure 5:
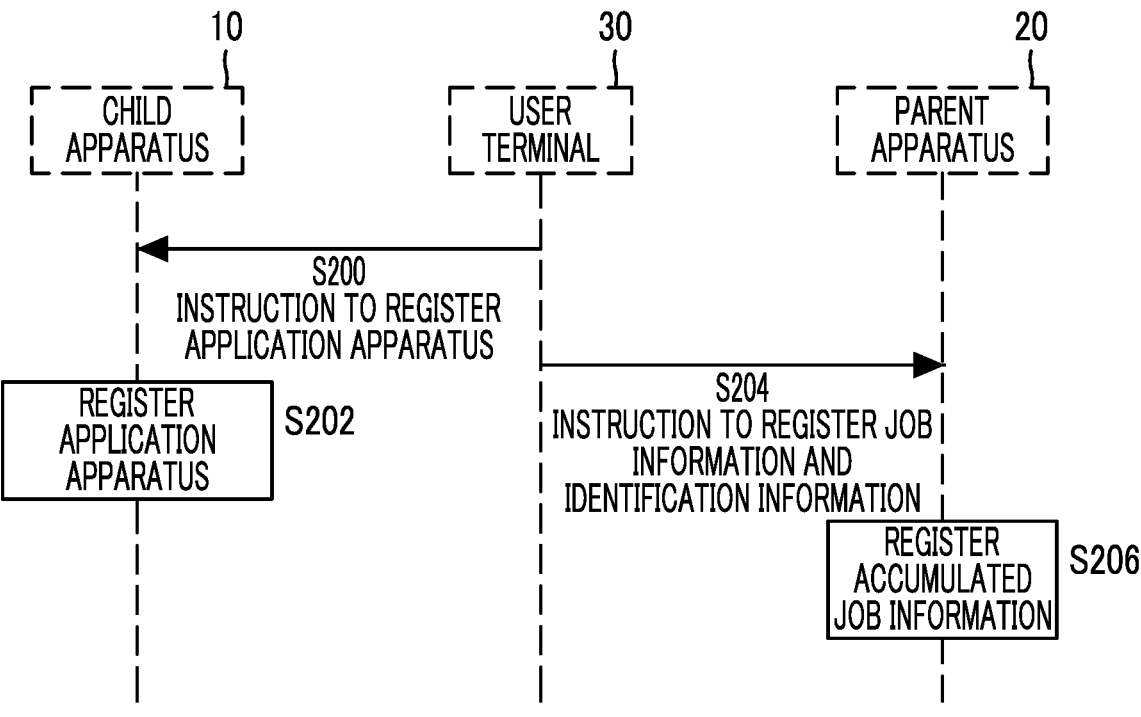
FIG. 5 is a sequence diagram showing an example of a flow of preprocessing in the information processing system according to the exemplary embodiment.

In step S200 of FIG. 5, the CPU 31 of the user terminal 30 transmits an instruction to register the child apparatus 10 or the parent apparatus 20 as the application apparatus in the child apparatus 10.

On the other hand, in step S202, the CPU 11 of the child apparatus 10 registers the application apparatus received from the user terminal 30 in the storage 14.

In step S204, the CPU 31 of the user terminal 30 transmits, to the parent apparatus 20, an instruction to register the job information and the identification information (that is, accumulated job information) for identifying the color conversion information associated with the job information in the parent apparatus 20.

On the other hand, in step S206, the CPU 21 of the parent apparatus 20 registers the accumulated job information received from the user terminal 30 in the storage 24.

Although the exemplary embodiment has been described above, the technical scope of the present invention is not limited to the scope described in the above-described exemplary embodiment. Various changes or improvements can be made to the above-described exemplary embodiment without departing from the gist of the invention, and the modified or improved form is also included in the technical scope of the present invention.

In addition, the above-described exemplary embodiment does not limit the invention according to the claims, and not all combinations of features described in the exemplary embodiment are required for the solution of the invention. The above-described exemplary embodiment includes inventions at various stages, and various inventions are extracted by combining a plurality of disclosed constituent requirements. Even though some constituent requirements are deleted from all the constituent requirements shown in the exemplary embodiment, as long as an effect is obtained, a configuration in which some constituent requirements are deleted can be extracted as an invention.

For example, in the present exemplary embodiment, in a case where the application apparatus and the apparatus that registers the color conversion information related to the identification information associated with the selected job do not match, the CPU 11 outputs the selected job without applying the color conversion information. However, the present disclosure is not limited to this example. In this case, the CPU 11 may not output the selected job, or may output the selected job by applying the color conversion information.

In addition, in the present exemplary embodiment, the application apparatus is determined before the job information is registered in the parent apparatus 20 by the user terminal 30. However, the present disclosure is not limited to this example. The application apparatus may be determined after the job information is registered in the parent apparatus 20 by the user terminal 30.

In addition, the application apparatus may be determined by the user via the input unit 25 or the like of the parent apparatus 20 instead of the user terminal 30. Alternatively, the application apparatus may be determined by an administrator or the like of the parent apparatus 20.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the present exemplary embodiment, although the form in which the information processing program 12A is installed in the ROM 12 or the storage 14 has been described, the present disclosure is not limited thereto. The information processing program 12A according to the present exemplary embodiment may be provided in a form recorded on a computer-readable storage medium. For example, the information processing program 12A according to the present exemplary embodiment may be provided in a form recorded on an optical disk such as a compact disc (CD)-ROM and a digital versatile disc (DVD)-ROM, or formed recorded in a semiconductor memory such as a universal serial bus (USB) memory or a memory card. In addition, the information processing program 12A according to the present exemplary embodiment may be acquired from an external device via the communication OF 17.

In addition, in the above-described exemplary embodiment, although a case where the processing in the information processing system 100 is realized by a software configuration by using a computer by executing a program has been described, the present invention is not limited thereto. For example, the processing in the information processing system 100 may be realized by a hardware configuration or a combination of the hardware configuration and the software configuration.

In addition, the configurations of the child apparatus 10, the parent apparatus 20, and the user terminal 30 described in the above-described exemplary embodiment are examples, and it is needless to say that an unnecessary part may be deleted or a new part may be added without departing from the spirit of the present invention.

In addition, the processing flows (see FIGS. 4 and 5) in the information processing system 100 described in the above-described exemplary embodiment are also examples, and it is needless to say that an unnecessary step may be deleted, a new step may be added, or a processing order may be changed without departing from the gist of the present invention.

In addition, the present disclosure is not limited to the above description, and it is needless to say that the present disclosure may be variously modified and implemented without departing from the gist thereof.

The following additional supplementary notes are disclosed regarding the above exemplary embodiment.

(((1)))

An information processing apparatus comprising:
a processor configured to:
acquire job information registered in another information processing apparatus different from the information processing apparatus and identification information for identifying color conversion information associated with the job information; and
output the job information by applying the color conversion information registered in a predetermined apparatus in a case where the color conversion information related to the identification information is registered in both the information processing apparatus and the other information processing apparatus.

(((2)))

The information processing apparatus according to (((1))), wherein the processor is configured to output the job information by applying the color conversion information registered in the information processing apparatus in a case where the information processing apparatus is registered as the predetermined apparatus.

(((3)))

The information processing apparatus according to (((1))) or (((2))), wherein the processor is configured to output the job information by applying the color conversion information registered in the other information processing apparatus in a case where the other information processing apparatus is registered as the predetermined apparatus.

(((4)))

The information processing apparatus according to any one of (((1))) to (((3))), wherein the processor is configured to output the job information by applying the color conversion information in a case where the color conversion information related to the identification information is registered only in one of the information processing apparatus and the other information processing apparatus and in a case where the predetermined apparatus matches an apparatus in which the color conversion information related to the identification information is registered.

(((5)))

The information processing apparatus according to (((4))), wherein the processor is configured to output the job information without applying the color conversion information in a case where the predetermined apparatus does not match the apparatus in which the color conversion information is registered.

(((6)))

The information processing apparatus according to (((1))), wherein the predetermined apparatus is an apparatus determined by a user who registers the job information in the other information processing apparatus.

(((7)))

The information processing apparatus according to (((6))), wherein the predetermined apparatus is an apparatus determined before the user registers the job information in the other information processing apparatus.

(((8)))

An information processing program causing a computer to execute:
acquiring job information registered in another information processing apparatus different from an information processing apparatus and identification information for identifying color conversion information associated with the job information; and
outputting the job information by applying the color conversion information registered in a predetermined apparatus in a case where the color conversion information related to the identification information is registered in both the information processing apparatus and the other information processing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire job information registered in another information processing apparatus different from the information processing apparatus and identification information for identifying color conversion information associated with the job information; and
output the job information by applying the color conversion information registered in a predetermined apparatus in a case where the color conversion information related to the identification information is registered in both the information processing apparatus and the other information processing apparatus.

2. The information processing apparatus according to claim 1, wherein the processor is configured to:
output the job information by applying the color conversion information registered in the information processing apparatus in a case where the information processing apparatus is registered as the predetermined apparatus.

3. The information processing apparatus according to claim 1, wherein the processor is configured to:

output the job information by applying the color conversion information registered in the other information processing apparatus in a case where the other information processing apparatus is registered as the predetermined apparatus.

4. The information processing apparatus according to claim 1, wherein the processor is configured to:

output the job information by applying the color conversion information in a case where the color conversion information related to the identification information is registered only in one of the information processing apparatus and the other information processing apparatus and in a case where the predetermined apparatus matches an apparatus in which the color conversion information related to the identification information is registered.

5. The information processing apparatus according to claim 4, wherein the processor is configured to:

output the job information without applying the color conversion information in a case where the predetermined apparatus does not match the apparatus in which the color conversion information is registered.

6. The information processing apparatus according to claim 1, wherein the predetermined apparatus is an apparatus determined by a user who registers the job information in the other information processing apparatus.

7. The information processing apparatus according to claim 6, wherein the predetermined apparatus is an apparatus determined before the user registers the job information in the other information processing apparatus.

8. A non-transitory computer readable medium storing an information processing program causing a computer to execute:

acquiring job information registered in another information processing apparatus different from an information processing apparatus and identification information for identifying color conversion information associated with the job information; and outputting the job information by applying the color conversion information registered in a predetermined apparatus in a case where the color conversion information related to the identification information is registered in both the information processing apparatus and the other information processing apparatus.

9. An information processing method comprising:

acquiring job information registered in another information processing apparatus different from an information processing apparatus and identification information for identifying color conversion information associated with the job information; and outputting the job information by applying the color conversion information registered in a predetermined apparatus in a case where the color conversion information related to the identification information is registered in both the information processing apparatus and the other information processing apparatus.

* * * * *